UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF BEVERAGE EXTRACTS.

1,204,032.      Specification of Letters Patent.      Patented Nov. 7, 1916.

No Drawing.      Application filed December 18, 1915. Serial No. 67,510.

*To all whom it may concern:*

Be it known that I, JOHN LEONARD KELLOGG, a citizen of the United States, residing in Battle Creek, county of Calhoun, and State of Michigan, have invented a new and useful Improvement in the Manufacture of Beverage Extracts, (Case P,) of which the following is a specification.

My invention relates in general to the manufacture of beverage extracts quickly soluble in water, from roasted cereals and other starch-bearing materials, such as wheat, corn, rye, barley, beans, peas, nuts, taro and arrow root, and the like.

More specifically, my invention relates to the manufacture of such soluble extracts in powdered form by evaporating the liquid beverage extract or solution to dryness *in vacuo* or otherwise at a temperature low enough to prevent burning.

My present invention consists in the manufacture of a beverage extract, preferably in the form of a soluble powder, by evaporating to dryness in the ordinary way a liquid extract or solution obtained usually by percolation from a mixture of roasted algarroba bean alone, or in combination with cereals or starch-bearing materials, such as wheat, corn, rye, barley, beans, particularly the soy bean, peas, nuts, taro, arrow root, and saccharine material, such as molasses, sugar, either cane or glucose, figs, prunes or other fruit.

In one method of carrying out my invention, the algarroba beans in sufficient quantity are first thoroughly washed and dried, roasted and ground into a coarse powder. The pulverized, dried and roasted algarroba beans are then steeped in hot water and all the extractive material is washed from the products by means of percolation. The extract is then evaporated to a thick syrup, preferably in a vacuum drier, to a density of 30° to 40° B. This syrup is then caramelized by the usual methods until it has a bitterish sweet flavor, and is of a very dark color found in commercial caramel.

If wheat or other cereal or starch-bearing material is to be used in combination with the algarroba bean, the wheat or other starch-bearing material is roasted and ground in the usual way, and mixed with the roasted and ground algarroba bean. Molasses or other saccharine material is then caramelized in the usual way, coated over bran, preferably wheat bran, and the mixture dried and roasted, according to the usual process. The caramelized saccharine body is then mixed in suitable proportions with the roasted and ground algarroba bean, together with the roasted wheat, soy bean or other starch-bearing material if used. A liquid extract or solution is then obtained from the mixture of roasted algarroba bean and caramelized saccharine body by percolation as usual, and the extract or solution evaporated to any desired degree of concentration, preferably to the form of a dry soluble powder.

The resulting extract, liquid or powdered, is quickly soluble in water, is very palatable and healthful, has the general flavor and characteristics of coffee, and is in other respects an improved substitute for coffee.

It is evident that the component parts of the mixture from which the concentrated extract is made, may be mixed together at any stage either before or after roasting, before or after caramelization of the saccharine material, or before or after the process of extraction.

I claim as my invention:

A soluble beverage extract comprising in its composition the extractive matter of roasted algarroba beans, soy beans, and caramelized saccharine material.

JOHN LEONARD KELLOGG.